United States Patent [19]

Ross

[11] 4,365,568
[45] Dec. 28, 1982

[54] UNDERBED THREAD TRIMMER AND CONTROLLED SINGLE-OPERATION CAM MECHANISM THEREFOR

[75] Inventor: Roger J. Ross, Mont St-Gregoire, Canada

[73] Assignee: The Singer Company, Stamford, Conn.

[21] Appl. No.: 150,254

[22] Filed: May 15, 1980

[51] Int. Cl.³ .............................................. D05B 65/00
[52] U.S. Cl. .................................. 112/291; 112/295; 112/298
[58] Field of Search ............... 112/291, 293, 295, 296, 112/298

[56] References Cited

U.S. PATENT DOCUMENTS

| | | | |
|---|---|---|---|
| 1,600,206 | 9/1926 | Allen | 112/293 X |
| 1,820,557 | 8/1931 | Carlson | 112/294 |
| 3,173,393 | 3/1965 | Adam | 112/291 |
| 3,359,933 | 12/1967 | Bono | 112/291 |
| 3,386,402 | 6/1968 | Ross | 112/291 |
| 3,602,170 | 8/1971 | Sakashita | 112/291 |
| 3,605,664 | 9/1971 | Hedegaard | 112/291 |
| 3,709,176 | 1/1973 | Papajewski et al. | 112/291 |
| 3,776,161 | 12/1973 | Papajewski et al. | 112/291 |
| 3,921,554 | 11/1975 | Uozaki et al. | 112/291 |

*Primary Examiner*—H. Hampton Hunter
*Attorney, Agent, or Firm*—Robert E. Smith; Edward L. Bell

[57] ABSTRACT

A single-operation cam mechanism includes a cam body with a cam surface extending along the body from an entrance location to an exit location. A cam follower is retained in a waiting position adjacent a part of the cam body at which the exit location is found. When the cam follower is moved free of the retainer, a spring forces the cam follower to the part of the cam where the entrance location is found. Then, as the cam rotates, the cam surface engages the follower and forces it back through the exit location and past a resilient trap to the waiting position. The trap snaps shut after the follower has been forced past it, and the surface of the trap then prevents the follower from moving back into engagement with the cam surface except by way of the entrance location. In an underbed thread trimmer, a support member for the cam follower engages a pin connected to blade-like members, some of which have hooks, to carry one set of such members to a position in which their hooks engage looptaker thread. Another set of such members is carried by the pin to a different location in which their hook engage a limb of needle thread. The follower is connected to the pin by a support member so that movement of the follower back to its waiting position retracts sets of hooks and draws the threads across separate ledger blades to sever them.

19 Claims, 8 Drawing Figures

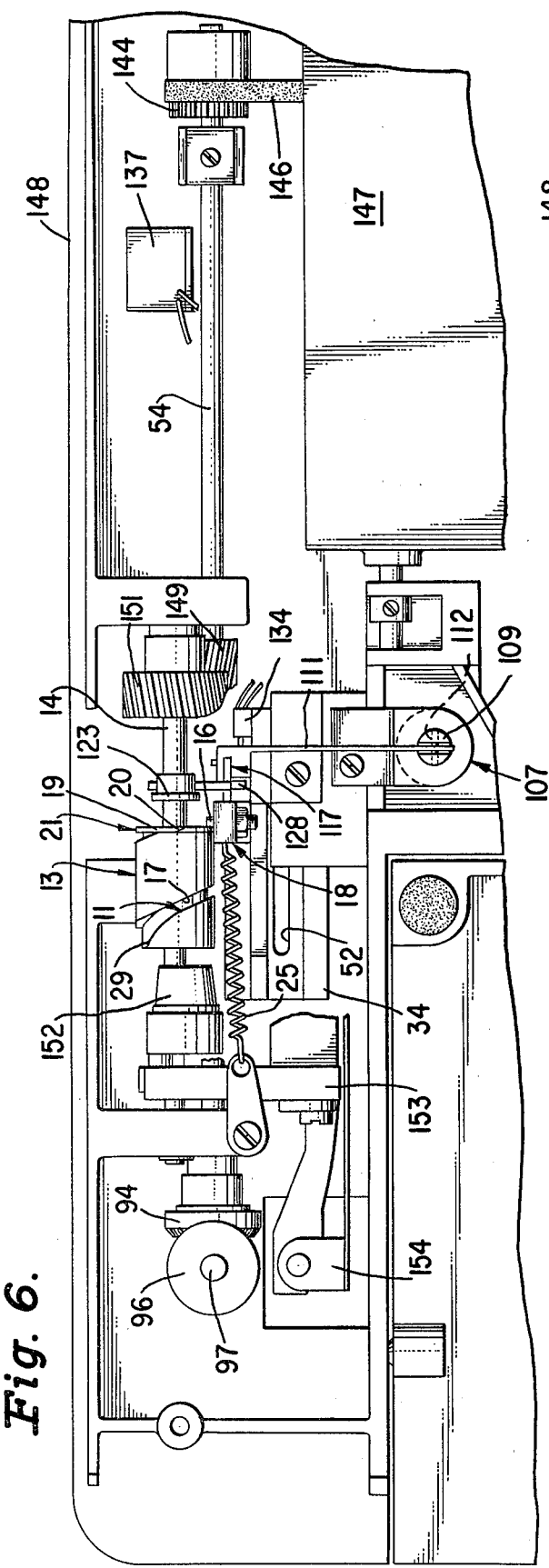
Fig. 6.
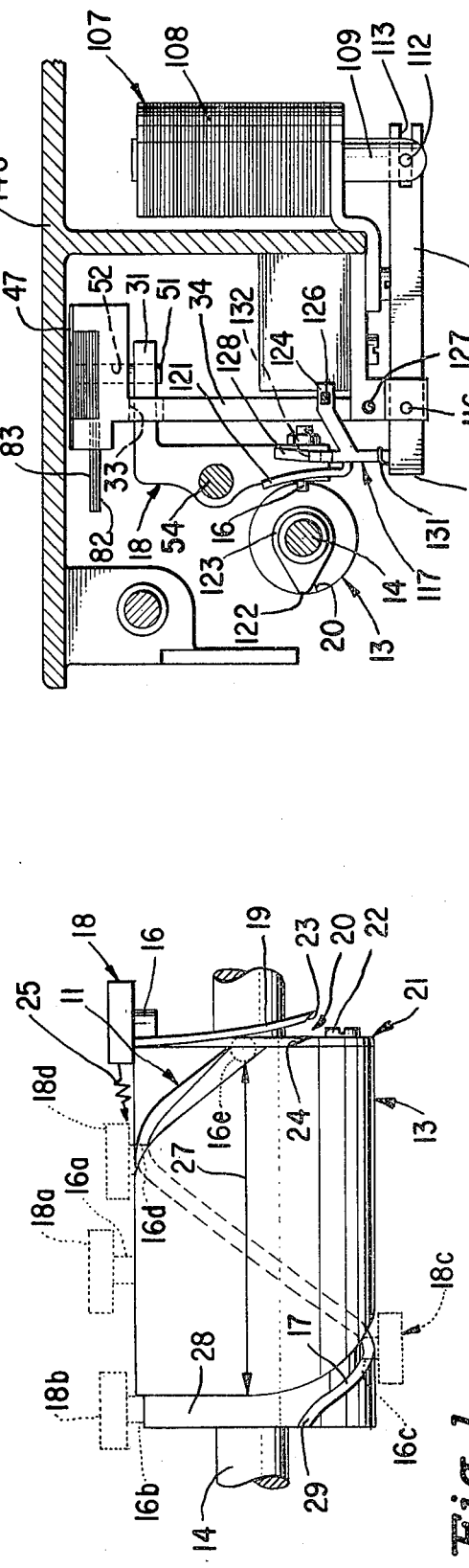
Fig. 7.
Fig. 1.

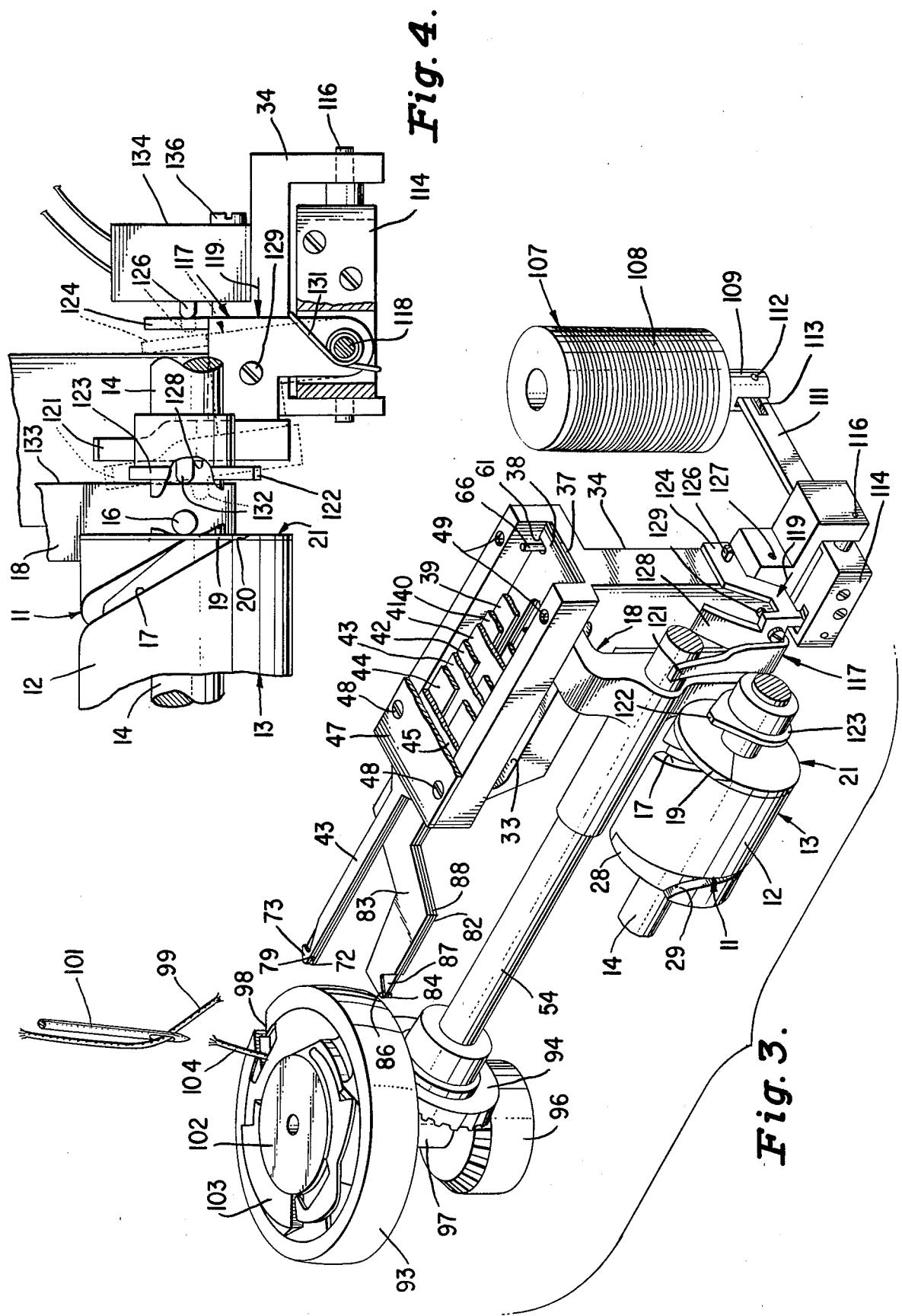

UNDERBED THREAD TRIMMER AND CONTROLLED SINGLE-OPERATION CAM MECHANISM THEREFOR

DESCRIPTION

BACKGROUND OF THE INVENTION

This invention relates to the field of single-operation cams and particularly to a cam mechanism in which a cam may be rotated indefinitely with follower means held in a waiting position until it is moved out of that position and forced, as by a spring, to travel to another point on the cam and into engagement there with a cam surface that will draw it back to the waiting position. In particular, the invention relates to an underbed thread trimmer for a sewing machine that incorporates a single-operation cam to drive hooks into position to engage the needle thread and looptaker thread at separate locations and to draw them back against ledger blades to sever both threads separately.

From time to time during a sewing operation, the operator cuts the needle and looptaker threads to withdraw the material from the sewing machine for any one of a number of purposes, such as to start a new seam or to begin work on new material. In order to withdraw material from the sewing machine, it is necessary for the needle to be in an elevated position, clear of the material being worked on. As a result, the needle thread is usually cut on the upwardly facing surface of the material being sewn. The looptaker thread engages the material from below, and the material is commonly turned over or withdrawn sufficiently from the stitch-forming region to allow access to the looptaker thread so that it can be cut on the opposite side of the material from the remaining end of the needle thread.

In order to keep the final stitches tight, it is common practice to backstitch before severing the threads. Alternatively, or in addition, after the threads have been severed one of them can be drawn through the material so as to be on the same side as the other thread, and the two ends can then be tied together to prevent any of the stitches from loosening.

Severing the threads by hand is undesirable in industrial sewing in which speed is frequently the most important consideration. As a result, industrial sewing machines frequently include a built-in trimming device that can be actuated whenever the operator desires to sever the threads. The most convenient locations for such severing, or trimming, devices is beneath the bed of the machine to sever the threads between the bed and the looptaker. Such devices have come to be known as underbed thread trimmers.

In industrial operations, the need for a high production rate makes manual tying of the severed threads too costly, and backstitching or the formation of a tack is used to hold the final stitches tight. Furthermore, it is desirable in industrial sewing to sever the threads as close to the material as possible to keep from wasting thread and to keep from having to trim the thread ends after they have been severed by the underbed mechanism. As a result, underbed thread trimmers on industrial sewing machines normally cut both threads at the same time and as close as possible to the material being worked on.

It is necessary to trim both the needle and loop-taker threads in such a way that there will be a sufficient length of thread to initiate the next stitching operation. The needle thread must not be trimmed so close to the needle or with the needle at such a location in its reciprocating cycle that the thread will be pulled out of the eye of the needle as the needle continues its cyclic motion.

A further problem associated with the provision of underbed thread trimmers is that of finding enough space for the mechanism. In the case of cyclic industrial sewing machines designed from the beginning with the recognition that underbed thread trimming mechanism will have to be incorporated, space to accommodate the mechanism can be reserved from the very beginning. Consumer sewing machines to be operated in the home are not usually as specialized as industrial machines and are likely to include a lot of mechanism that is not used in every sewing operation. Thus, an underbed thread trimmer for a consumer sewing machine must compete for space within the housing of the machine with other stitch-forming apparatus.

In my prior thread trimming mechanism shown and claimed in U.S. Pat. No. 3,386,402, the looptaker was a rotary hook with a bobbin in it and the main part of the trimming mechanism was separated from the stitch forming mechanism. In addition, another hook was arranged to grasp both the needle and bobbin threads at the same time and in the same location. Other underbed thread trimming devices are described in the following U.S. Pat. Nos.: 3,173,393; 3,359,933; 3,602,170; 3,605,664; 3,709,176; 3,776,161 and 3,921,554. None of the foregoing patents has a single-operation cam, as that term is used herein, and each of the patents provides means to bring both the needle thread and the looptaker thread into one place to be severed simultaneously by the cutting edge of a blade, either alone or acting in a scissoring action with a second blade at the same location.

OBJECTS AND SUMMARY OF THE INVENTION

It is one of the objects of this invention to provide an improved single-operation cam structure.

Another object of the invention is to provide an underbed thread trimming mechanism incorporating the improved single-operation cam structure.

A further object is to provide an underbed thread trimmer incorporating means to cut the looptaker thread and needle thread at separate locations.

Yet another object of this invention is to provide underbed thread trimming mechanism suitable for use in a general purpose sewing machine.

A further object of this invention is to provide an underbed thread trimmer that will fit into space available in a consumer sewing machine capable of performing a variety of stitching operations.

Still further objects will become apparent from the following specification, together with the drawings.

In accordance with the present invention, a single-operation cam arrangement includes a cam body that has a cam surface and is mounted on an axle for rotation. The cam surface has an entrance end and an exit end, and the cam arrangement includes a follower and means to urge the follower to the entrance end of the cam surface and into engagement with the latter at that location. The follower is drawn along the cam surface by rotation of the cam and passes through an exit trap at the exit end of the cam surface. This trap prevents the follower from returning to contact with the cam surface until a single operation is desired. The single operation is initiated by moving the cam follower beyond the edge of the trap to allow the follower to be moved to the entrance end of the cam by a spring, for example.

An underbed thread trimming mechanism according to the present invention includes the single-operation cam arrangement with separate hooks connected to the cam follower to be moved thereby from a waiting position beyond the trap at the exit end of the cam surface, where the follower can remain for as long as the machine operator desires, and is then to be moved relatively quickly, along with the cam follower, to the entrance and to extend the hooks into position to intercept, separately, needle and looptaker threads at specific points in a stitch cycle. Afterwards, the hooks are moved back to a retracted, waiting position as the cam follower is drawn along the cam surface back to the exit end of the cam and past the trap to the waiting position. As the hooks are retracted, they draw the needle and looptaker threads against separate ledger blades to sever the threads at different locations and to leave sufficiently long thread ends extending from the work material to make it possible for the ends to be ties in a knot to keep the stitches from becoming loosened.

BRIEF DESCRIPTION OF THE DRAWINGS

FIG. 1 is a side elevational view of one embodiment of a single operation cam arrangement according to this invention;

FIG. 3 is a perspective view of the main components of an underbed thread trimmer with some of the parts broken away to clarify the relative positions of internal components;

FIG. 4 is an enlarged view of part of the actuator mechanism for the underbed thread trimmer in FIG. 3;

FIG. 6 shows part of a sewing machine from below to illustrate the way the underbed thread trimming mechanism of FIG. 3 may be incorporated into the machine;

FIG. 7 is a cross-sectional view along the line 7—7 in FIG. 6 of a fragment of the sewing machine incorporating the underbed thread trimmer; and, FIG. 8 shows the top of the same fragment of the sewing machine as in FIG. 6 with parts broken away to make the interior visible.

DETAILED DESCRIPTION OF A PREFERRED EMBODIMENT

Figure 2:
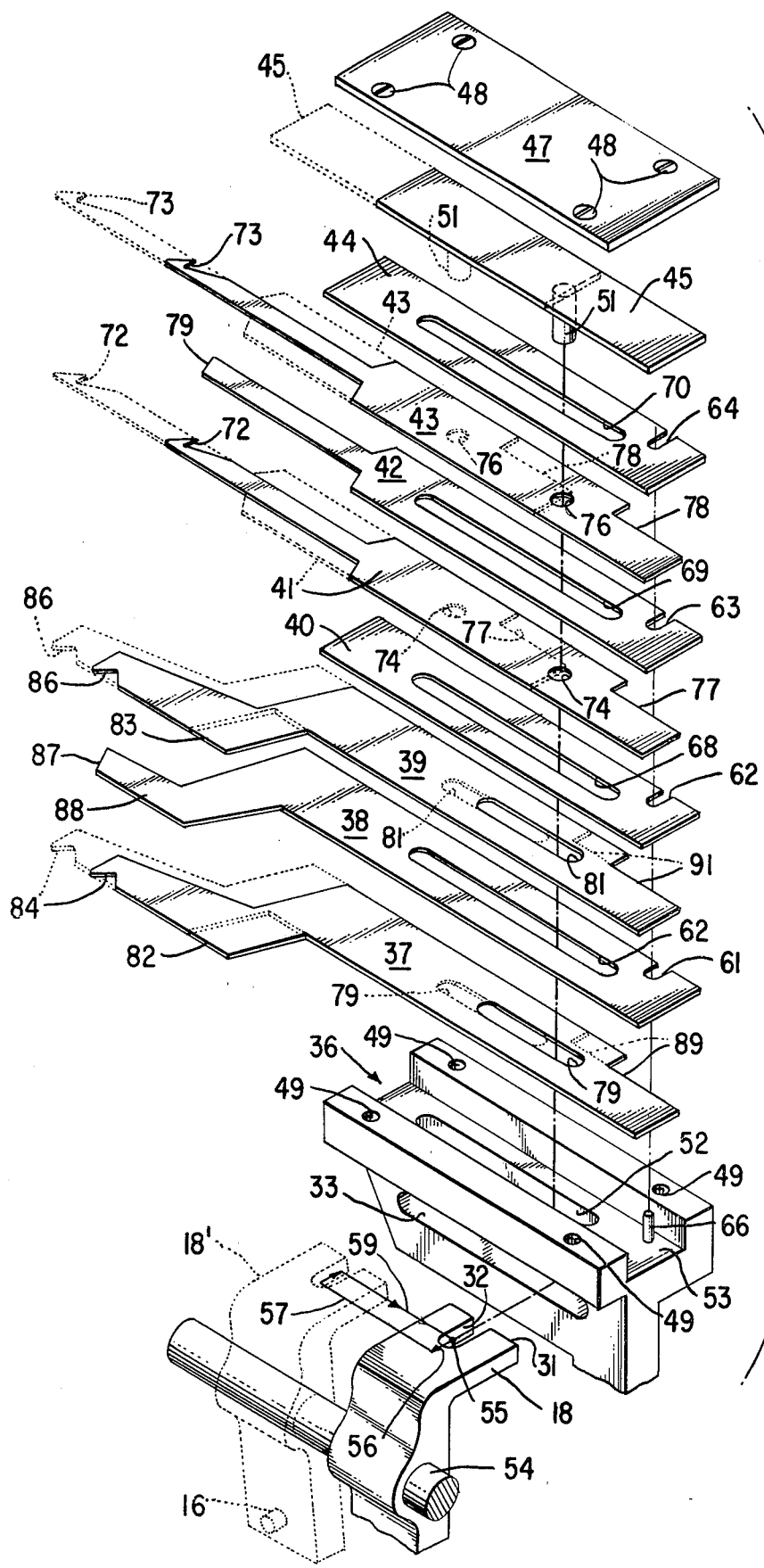
FIG. 2 is an exploded, perspective view of thread hooks and ledger blades and a support structure for them.

FIG. 1 shows one form of single-operation cam arrangement that includes a helical track 11 along the cylindrical surface 12 of a cam body 13. An axle 14 coaxial with the cylindrical surface 12 supports the cam and is rotated by means not shown in FIG. 1. A cam follower suitable for use with the cam 13 includes a pin 16 that fits in the track 11 to engage the camming surface 17, which is one of the walls of the slot, and is held by a support member 18. The support member is also indicated in several other positions 18a–8d, but only in dotted lines. The cam follower is indicated in dotted lines in corresponding positions 16a–16d and in an additional position 16e in which the support member is not shown for the reason that the support member would obscure an important element of the cam arrangement in that position.

The element that would be obscured is a resilient trap 19 that is part of a resilient member 21 attached to one end of the cam 13 by means of a screw 22. The resilient member 21 is an annular disc of thin, spring steel having an outer diameter equal to the diameter of the cylindrical surface 12 of the cam 13 and having an inner diameter at least large enough to fit loosely over the shaft 14. The resilient member 21 has a slot 20 that extends generally radially from the outer edge of the resilient member to the inner edge. Preferably, this slot is formed in such a way as to have sloping surfaces 23 and 24, but if the member 21 is thin enough, the surfaces that define the slot need not slope. The resilient member is placed on the end of the cam 13 so that the sloping surface 24 forms an extension of the camming surface 17 or is displaced angularly therefrom in the direction in which the cam would be rotated to drive the follower 16 into contact with the trap 19, as shown in position 16e.

When the axle 14 is so rotated, which would be clockwise as viewed from the axle toward the resilient member 21 in this embodiment, with the follower in position 16e, where it is just about to move through the slot 20, the camming surface 17 forces the follower axially against the trap. Continued pressure produced by continued rotation of the shaft 17 pushes the trap 19 outwardly far enough to allow the follower 16 to move along the surface 24 to the outer surface 26 of the resilient member 21. As the axle 14 continues to rotate, the resilient trap 19 snaps back flat against the end surface of the cam 13. The axle 14 can continue to rotate as long as may be desired, during which time the cam follower 16 cannot pass back through the trap to re-enter the track 11 nor be influenced by the cam 13 in any way.

The cam follower 16 moves only longitudinally and radially with respect to the cam 13, but in order to illustrate the relative positions between the follower 16 and the track 11, the follower is shown in several positions that could only be reached by angular movement around the cam. Thus, although the cam follower 16 can only move back and forth along the path indicated by an arrow 27, its waiting position indicated in full lines, adjacent a first part of the cam body is shown displaced 90° around the cam from the illustrated location of the arrow and with the follower against the surface 26.

The support member 18 is shown in its corresponding waiting position pulled against the end of the cylindrical surface 12 and against the outer edge of the resilient member 21 by a spring 25. This spring exerts force that urges the support member toward the opposite end of the cam 13 and toward the axis of the cylindrical surface 12. As long as the distance between the edge of the resilient member 21 and the point on the head of the screw 22 farthest from the axis of the surface 12 is greater than the axial length of the follower 16, there will be no interference between the follower and any part of the rotating cam 13 when the follower is in the waiting position.

The follower 16 is actuated to carry out a cycle of operation by simply moving the support 18 radially outwardly from the waiting position sufficiently to allow the tip of the follower to clear the outer edge of the resilient member 21. This allows the spring 25 to pull the support member and the follower toward a remote part of the cam body, i.e., the opposite end of the cam 13. As the support member and the cam follower travel longitudinally along the cam 13, the support member must be radially spaced from the axis of the cam at least as far as is indicated by the support member position 18a. In this position, the cam follower is in the position 16a, which allows it to slide longitudinally along the cylindrical surface 12. It must be kept in mind that, at all times, the follower 16 is constrained to move along the path identified by the arrow 27 and cannot actually move around the cam 13 to the positions indicated by reference numerals 16 or 16a–16d, for example.

The spring 25 must have enough stored force to move the support member quickly so that the cam follower cannot drop into the track 11, for example at the position 18d, as it moves along the surface 12. The support member must not move radially inwardly until it reaches the position 18b at the opposite end of the cam 13, at which time it can move radially inwardly so that the bottom of the cam follower in the location 16b can engage a generally spirally shaped surface 28 that leads into the track 11. It will be noted that the depth of the surface 28 relative to the surface 12 when the relative angular position between the cam 13 and the follower is that shown in the position 16b is less than the full depth of the track 11. However, the surface 28 spirals down to the depth of the track 11 at the entrance end of the track.

The entrance portion of the track 11 has a funnel shape as provided by a surface 29. The support member is constrained so that it will not move farther to the left than is shown in the position 18b, and thus, when the cam 13 rotates clockwise, the surface 29 forces the follower 16 to move into the track 11. The position 18c of the support member and 16c of the follower corresponds to the position of the follower and support member shortly after entering the track 11 and being forced longitudinally toward the right against the force of the spring 25.

The track 11 shown in FIG. 1 makes only a single turn in passing from one end of the cam 13 to the other, and the support member position 18d and cam follower position 16d are half a turn apart. A single turn cam is desired when the cam is to be used to control the operation of an underbed thread trimmer for a sewing machine but should not be considered as a basic limitation on the cam. It would be possible for the pitch of the track 11 to be greater or less than is shown so that the cam 13 could make less than or more than one turn in driving the follower longitudinally from the lefthand end of the cam 13 back to the right-hand end.

After the follower has been drawn back along the track 11 past position 16e and has emerged through the slot 20 between the surfaces 23 and 24 of the resilient member 21, it can return to remain in the waiting position at the righthand end of the cam while the shaft 14 rotates for an indefinite period of time. However, once the support is lifted radially away from the axis of the surface 12 to allow the follower to clear this cylindrical surface, the follower 16 will move in a constrained manner as determined by the camming surface 17 and the rotation of the cam 13 to complete another single operation of the type just described.

The cam structure in FIG. 1 is especially useful as part of an underbed thread trimming device for a sewing machine, particularly a consumer sewing machine. FIG. 2 shows hooks and cutting ledger blades to snare and cut thread in an underbed thread trimmer. These hooks and blades will first be described independently of their relationship to other components of a sewing machine. In FIG. 2, the support member 18 has an end 31 with a slot 32 in it. The end 31 extends through an elongated slot 33 in a guide structure 34 that has a longitudinal guide slot 36. Flat, blade-like members 37–45 fit in the guide slot 36 and substantially fill it up. They are held in place by a top plate 47 attached to the guide structure 34 by means of four screws 48 that fit into threaded holes 49 in the guide structure. The uppermost blade-like member 45 has a pin 51 rigidly attached to it and extending down through openings in all of the other blade-like members 37–44 and through a slot 52 that extends axially along the center of the bottom surface 53 of the guide structure 34. The support member 18 is journalled on a shaft 54 that allows the support member to move freely in the longitudinal direction of the shaft to establish the path indicated by the arrow 27 for the cam follower 16 in FIG. 1. The pin 51 fits into the slot 32 in the end of the support member 18 to be moved longitudinally along the guide slot 36 by movement of the support member 18 along the shaft 54 between the position shown in full line and the position 18' shown in the dotted lines. The cam follower 16 is located at the opposite end of the support member from the end 31.

The path of movement of the end 31 of the support member 18 is illustrated by a closed loop of arrows starting at a point 55 that corresponds to the waiting position of the support member 18 as shown in FIG. 1. In accordance with the description of operation of the cam mechanism in FIG. 1, the first step of movement of the support member is to move radially away from the axis of the shaft 14 sufficiently to allow the cam follower 16 to clear the edge of the resilient member 21. This movement of the support member 8 is illustrated in FIG. 2 by an arrow 56 that begins at the point 55 as the support member pivots about the shaft 54, which causes the end 31 to move perpendicularly away from the guide member 34 but not far enough to allow the pin 51 to become disengaged from the slot 32.

As soon as the cam follower 16 (FIG. 1) clears the perimeter of the resilient member 21, the support member 18 is free to slide to the other end of the cam 13 quickly and without stopping and then to be pulled radially inwardly with respect to the cylindrical surface 12, all under the force of the spring 25 in FIG. 1. This motion is indicated in FIG. 2 by the long arrow 57 that starts from the end of the arrow 56 and extends parallel to the longitudinal direction of the guide member 34 for a distance corresponding to the length of the cam 13 in FIG. 1, at which point the arrow 57 bends at a right angle toward the guide member 34. The position 18' of the support member 18 is illustrated at the point at which the path of movement indicated by the arrow 57 bends.

In FIG. 1, the entrance end of the slot 11 picks up the cam follower 16 and forces it back to the end of the cam at which the resilient member 21 is located. This movement is much slower than the sudden movement of the cam follower and support member acting under the force of the spring 25 that draws the cam follower and support member away from the end at which the resilient member 21 is located. Therefore, in FIG. 2 the movement of the support member 18 from the position 18' back to the original position is indicated by two arrows 58 and 59, which, by their length, suggest the relatively slow return motion of the support member 18.

The movement of the pin 51 in FIG. 2 is constrained by the slot 52 so that the pin does not follow motion of the support member 18 perpendicular to the longitudinal dimension of the slot but only follows the motion parallel to the slot. Only certain of the blade-like members 37–45 are permitted to move, and their motion is constrained by the slot 36 to a direction exactly parallel to the longitudinal direction of the guide member 34. Three of the members 38, 40, 42, and 44 are not allowed to move at all. These members have notches 61–64 that hook onto a rigid pin 66 held in a fixed position on one side of the slot 36 of the guide member 34. Each of these fixed members has an elongated central slot 67–70, respectively, to allow the pin 51 to move freely as the support member 18 forces it to move along the slot 52. The members 40 and 44 are only spacer members that separate the other blade-like members.

The members 41 and 43 have hooks 72 and 73 at their ends, respectively, to engage one of the threads as will be described hereinafter. For reasons having to do with the operation of the thread trimming apparatus, it is desirable that the members 41 and 43 slide the full distance of the movement of the support member 18. As a result, the members 41 and 43, which may be called hook members, have apertures 74 and 76, respectively, that fit relatively closely around the pin 51 so that any movement of the pin will cause a corresponding movement of the hook members. In order to keep such movement from being interfered with by the pin 66, both of the hook members 41 and 43 have notches 77 and 78, respectively, cut in the corner where the pin 66 is located.

As will be described in more detail hereinafter, the purpose of the hooks 72 and 73 is to engage of the threads and to draw that thread back to be cut by a ledger blade 79 at the end of the fixed member 42, which may be called a ledger blade member. In actual use, the blade-like members 37–45 are held in surface-to-surface sliding contact with each other. Thus, the hook members 41 and 43 are each in surface-to-surface contact with the ledger blade member 42. By pulling a thread with both of the hooks 72 and 73 on opposite sides of the ledger blade 79, the very short part of the thread between the hooks, the length of which part is no greater than the thickness of the ledger blade 79, is held taut so as to be easily cut by the ledger blade. The forwardmost position of the hook members 41 and 43, when they are extended to engage a thread, is illustrated in dotted lines.

For reasons having to do with the operation of the sewing machine, and as will be described hereinafter, the blade-like members 37 and 39 need not move as far as the hook members 41 and 43 and the members 37 and 39 thus have slots 80 and 81 to permit some relative motion between the pin 51 and the blade-like members 37 and 39. However, these slots are not as long as the slot 52, and therefore, when the pin 51 is moved the full distance of motion of the support member 18, the blade-like members 37 and 39 will at least move from the position shown in full lines to the position shown in broken lines. These blade-like members have off-set arms 82 and 83, respectively, and they have hooks, or notches, 84 and 86, respectively. When these members are extended, the notches occupy the positions indicated in dotted lines to engage a limb of the needle thread to pull it toward a ledger blade 87 at the end of an arm 88 off-set from the main part of the blade-like member 38 and directly aligned with the arms 82 and 83. As in the case of the hooks 72 and 73, the notches 84 and 86 pull only a short, taut length of thread against the ledger blade 87 and cut it by a scissoring action. Also like the blade-like members 41 and 43, the movable blade-like members 37 and 39 are provided with notches 89 and 91, repectively, to keep thee blade-like members free of the fixed pin 66.

FIG. 3 shows the elements in FIGS. 1 and 2 located in their respective operative positions close to each other and with additional elements utilized in an underbed thread trimmer.

The looptaker in this embodiment is a rotary hook 93 and the shaft 54 is a hook drive shaft to drive the rotary hook. The shaft 54 is connected to the hook by way of two bevel gears 94 and 96, the latter of which is connected to the hook 93 by a vertical axis shaft 97. The hook 93 includes a beak 98 that picks up a loop of needle thread 99 formed, or shed, in close proximity with respect to the beak 98 by means of a needle 101 in a well known manner.

A bobbin 102 is held in a bobbin case 103 within the hook 93. By well known means, the bobbin case 103 is prevented from rotating with the hook 93, but the bobbin 102 is able to rotate to the extent necessary to feed bobbin thread 104 into proper stitch forming relationship with the needle thread 99.

The hook 93, the bobbin 102, and the bobbin case 103 are all standard elements of existing sewing machines except for a relatively small recess 106 formed in the case 103 in position to receive the ends of the arms 82 and 83 when they are driven forward by means of the support member 18.

The blade-like members 37, 39, 41, and 43 are pushed toward the hook 93 by the support member 18 acting upon the pin 51 (shown in FIG. 2). The support member 18 is shown in its waiting position with the cam follower pin 16 resting against the resilient member 21. A solenoid 107 comprising a coil 108 and an axially movable magnetic plunger 109 supplies the force to move the support member 18 out of its waiting position so that it can travel to the other end of the cam 13 in response to the force of the spring 25 (FIG. 1). The plunger 109 is connected to an arm 111 by means of a pin 112 that extends through a slot 113 at the end of the arm 111. The arm 111 is connected to a pivoted member 114 pivotally mounted on a fulcrum 116 held in a part of the guide structure 34. A release device 117 is pivotally mounted on an axle 118 in the pivoted member 114, and a spring within the pivoted member applies pressure in the direction of the arrow 119 to pivot the release device 117 toward the support member 18. The release device has a curved cam follower 121 located in a position to be engaged by the peak 122 of a cam 123, but only under certain circumstances, which will be described hereinafter.

The release device 117 has an arm 124 that extends into position to engage the push button 126 of a normally-closed microswitch. For the sake of clarity, the only part of the microswitch shown in FIG. 3 is the pushbutton 126. However, the guide structure 34, has a threaded hole 127 to facilitate attaching the microswitch to the guide structure by means of a screw. The release device also has an arm 128 located between the cam follower 121 and the support member 34, and it has an adjustable stop in the form of a screw 129 threaded into the release device 117 to set the location of the cam follower 121 relative to the cam 123 by controlling the position of the release device 117 relative to the front surface of the support member 34.

FIG. 4 shows an enlarged view of the components in FIG. 3 closely associated with the release device 117. Some of these components are shown partly broken away to illustrate the internal construction. One such component is the pivoted member 114, part of the front of which is broken away to show the axle 118 that supports the release device 117 for limited pivotal movement within the support member 114. A spring 131 engages the release device 117 and the pivoted member 114 to apply pressure in the direction of the arrow 119 to pivot the release device counterclockwise about the axle 118 from the position of the actuator illustrated in solid lines toward the position illustrated in dotted lines.

The main reason the cam 123 and the shaft 14 are broken away is to illustrate a projection 132 that extends from the release device 117. In this embodiment, the projection 132 extends from the edge of the arm 128, into contact with the juxtaposed surface 133 of the support member 18. The broken-away shaft 14 makes the cam follower 16 visible, also, because the cam follower is in its waiting position. A normally-closed microswitch 134, for which the pushbutton 126 is the actuator, is mounted on the guide structure 34 by means of a screw 136 threaded into the hole 127 shown in FIG. 3.

As may be seen in FIG. 4, when the cam follower 16 and the support member 18 are in their waiting position while a seam is being sewn, the beak 122 of the cam 123 rotates generally in line with the space between the cam follower 121 and the side surface 133 of the support member 18.

Figure 5:
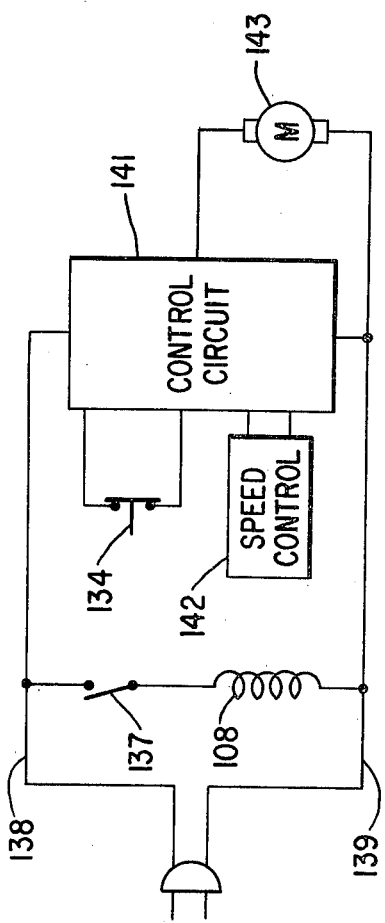
FIG. 5 is a simplified schematic drawing of an electrical circuit suitable for use with the underbed thread trimmer in FIGS. 3 and 4.

FIG. 5 is a simplified electrical circuit diagram of an operating circuit for the apparatus in FIGS. 3 and 4. In FIG. 5, the solenoid coil 108 is connected in series with a normally open switch 137, which may be a pushbutton switch mounted on the bed of a sewing machine. This series circuit is connected across a pair of power supply lines 138 and 139. A control circuit 141 is also connected across the lines 138 and 139 and has two input circuits, one connected to the microswitch 134 shown in FIG. 4, and the other to a speed control 142, which is usually a foot-operated device. The output of the control circuit 141 is connected to a motor 143 that drives the sewing machine.

The operation of the release device 117 will be described next with reference to FIGS. 3-5.

When the hook 93 and the needle 101 in FIG. 3 are being operated in the normal manner to make stitches, the hook shaft 54 rotates counterclockwise and the shaft 14, which drives the feed mechanism (not shown), rotates clockwise. These shafts can continue to rotate indefinitely to produce as long a seam as may be desired, and while they are rotating, the release device 117 waits in the position shown.

When a single operation of the cam arrangement is to be carried out in the manner previously described to cut the threads 99 and 104, the operator actuates the switch 137 (FIG. 5) to energize the solenoid 107 momentarily to cause the plunger 109 to be pulled upwardly from the position illustrated in FIG. 3. This pivots the arm 111 counterclockwise about the fulcrum 116 and pivots the release device 117 in the same counterclockwise direction, initially.

The projection 132 in FIG. 4 is therefore caused to move forward (i.e., perpendicularly out of the plane of the drawing and toward the viewer) so that it no longer makes contact with the side surface 133 of the support member 18. When this happens, the spring 131 is able to pivot the release device 117 counterclockwise to the position illustrated in dotted lines so that the projection 132 is in front of the lower end of the support member 18. This movement of the release device 117 moves the arm 124 away from the pushbutton 126 and allows the microswitch 134 to close, thereby energizing the control circuit 141 to start the motor 143, preferably at a relatively slow speed. Movement of the release device also shifts the cam follower 121 to a position where it is in line with the cam 123. The extent of this pivotal movement of the release device about the axle 118 is sufficient to bring the edge of the arm 128 against the facing surface 133 of the support member 18.

The switch 137 may be actuated when the hook 93 is at any point in its cycle of operation, but the hooks 72, 73 and 84, 86 must not move forward until the needle 101 is out of the way. This is accomplished by orienting the cam 123 on its shaft 14, which is driven from the hook shaft 54 by standard gears, so that the peak 122 has a specific position relative to the beak 98 of the rotary hook 93. The cam follower 121 is so shaped that, at a specific point during the next rotation of the cam 123, its peak 122 will engage the surface of the follower 121, thereby forcing the follower 121 and the rest of the release device 117 to pivot clockwise about the fulcrum 116. The solenoid 107 is no longer energized and so there is no magnetic force to oppose the pressure of the peak 122 forcing the cam follower 121 back away from the shaft 14. Since the projection 121 is now in contact with the front surface of the support member 18, this movement of the release device 117 pivots the support member 18 counterclockwise around the shaft 54 and moves the cam follower 16 away from the shaft 14 sufficiently to clear the perimeter of the resilient member 21. When this happens, the support member 18 and the cam follower 16 are suddenly drawn toward the opposite end of the cam 13 by the force stored in the spring 25 (FIG. 1). The support member carries the pin 51 along and the pin, in turn, carries the hooks 72 and 73 and the notches 84 and 86 to positions adjacent the rotary hook 93 to snare the threads 104 and 99, respectively, as will be described hereinafter.

The release device 117 remains pivoted slightly toward the cam 13. The track 11 and the cam 123 are angularly positioned relative to each other about the axis of the shaft 14 so that the cam follower 16 is drawn by the cam surface 17 back through the slot 20 just as the peak 122 of the cam 123 reaches a position where it would engage the cam follower 121 on the next revolution of the shaft 14. However, the movement of the cam follower 16 causes the surface 133 of the support member 18 to press against the end of the projection 132 and pivot the release device 117 clockwise around the axle 118 back to the position shown in FIG. 3. Thus, the cam follower 121 just misses being actuated by the peak 122 a second time. Instead, the cam follower 16 escapes through the slot 20 back to the position shown in FIG. 3, where it can remain as long as may be desired until the operator again energizes the coil 108 of the solenoid 107.

When the release device 117 pivots clockwise as the cam follower 16 moves out of the track 11 and through the slot 20, the arm 127 of the release device presses against the pushbutton 126 and opens the microswitch 134. This turns off the motor 142 and causes the machine to stop, which denotes the end of a single operation of the cam arrangement.

FIG. 6 shows the way the apparatus of FIGS. 3 and 4 fits into an existing sewing machine, specifically a Singer Model 2000. It is to be understood that the invention is not limited to incorporation in any specific machine.

Only a fragment of the underside of the sewing machine is shown, and in addition, some of the parts are broken away to reveal components that would otherwise be hidden. One of the parts that has been broken away is the hook shaft 54. This shaft has a gear 144 at one end driven by a timing belt 146. The timing belt, in turn, is driven by the motor 143, which is hidden behind a plate 147.

The pushbutton switch that initiates a cycle of the single operation cam arrangement is shown mounted on the underside of the bed 148 of the machine. In this embodiment, the bed 148 is convertible, which means that the stitch-forming mechanism in it must be compact enough to fit into a cylinder bed. Essentially, the bed 148 may be considered to be a cylinder bed.

Another gear 149 is rigidly attached to the hook shaft 54 and is meshed with a gear 151 on the shaft 14. The relative diameters of these gears is such that the shaft 54 rotates twice as fast as the shaft 14.

The apparatus associated with the cam 13 has been described in connection with FIGS. 3 and 4 and need not be described again except to say that the cam 13 is mounted on the shaft 14 between the gear 151 and an eccentric 152. The latter is coupled by linkage means 153 and 154 to a standard feed dog to feed material during the sewing process.

FIG. 7 shows a cross-section of the apparatus in FIG. 6 to illustrate the position of the single operation cam arrangement relative to some of the other parts of the machine. As may be seen, the guide structure 34 is just under the surface of the bed 148 so that the blade-like members can be in the limited space between the bed and the relatively flat, horizontal top of the rotary hook 93 (FIG. 3). Furthermore, the compact arrangement of the blade-like members and the fact that they move back and forth along a narrow path of smaller width than the rotary hook allows the underbed thread trimming mechanism of this invention to fit into available space in the bed 148 without disturbing the feed mechanism.

Figure 8:
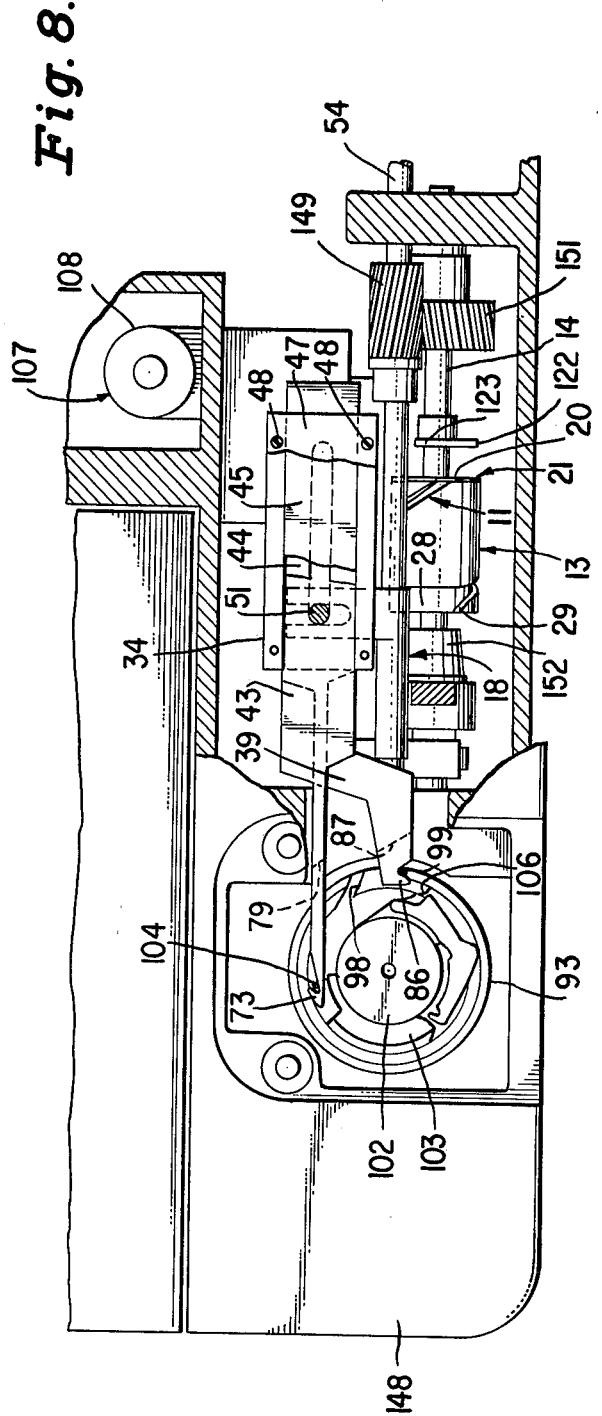

FIG. 8 shows a top view of approximately the same part of the machine of which FIG. 6 shows the underside. In FIG. 8, the support member 18 is shown at the opposite end of the cam 13 from its waiting position. As a result, the hook 73 is shown extended to a looptaker thread engaging position to snare the looptaker thread 104. The hook 73 extends far enough to engage the bobbin thread even when the sewing mechanism is set to make zig-zag stitches with the widest bight. In addition, the needle thread 99 is shown within the notch 86 at the end of the arm 83. The notch 86 extends over adjacent regions of the rotary hook 93 and the bobbin case 103 in the needle thread engaging position of the arm 83. The needle thread engaging position is so far from the path of the needle 101 that the needle thread will be snared in the hook 86 even if the stitch-forming mechanism is set to the widest possible bight. This clearly shows the separation between the points at which the two threads are snared, or engaged, although both of them are engaged at a level beneath the bed 148.

The looptaker thread 104 always remains in approximately the same position. It emerges from the left side of the bobbin 102, as the bobbin is positioned in FIG. 8, and it passes up through the needle opening in the throat plate (not shown) to connect with the last stitch formed in material held down against the throat plate in the usual manner.

The needle thread 99, on the other hand, is pulled around the bobbin case 103 by the beak 98 of the hook 93 each time a stitch is formed. This makes it possible to locate the notch 86, and its companion notch 84, which is directly beneath it, approximately three-fourths of the way around the hook 93 in the counterclockwise direction from the location at which the needle 101 (FIG. 3) pierces the material in making each stitch.

When the blade-like members 43 and 39 are drawn back to the right from the positions in which they are illustrated in FIG. 8, the hook 73 and the notch 86 pull the respective threads 104 and 99 against the ledger blades 98 and 87, respectively, to sever these threads. The length of thread remaining extending from the needle and from the looptaker after severing is sufficient to make it easy to start the first stitch of the next seam to be sewn. Furthermore, the lengths of needle and looptaker threads extending from the work material after the threads have been severed in the positions illustrated for the ledger blades 87 and 98 are sufficient to allow a knot to be tied in those threads to prevent any loosening of the stitches in the work material. Typically, the threads extend from the material about two or three centimeters or so.

While this invention has been described in terms of a specific embodiment, it will be understood by those skilled in the art that modifications may be made therein without departing from the true scope of the invention as defined by the following claims.

What is claimed is:

1. An underbed thread trimmer in a sewing machine comprising a bed, a needle reciprocatingly driven along a path toward and away from the bed, a needle thread carried by the needle, looptaker means supported in the bed for seizing a loop of needle thread shed by the needle, the looptaker means containing a quantity of looptaker thread for concatenation with the needle thread to form stitches, and driving means for driving the looptaker in synchronism with the reciprocation of the needle, the underbed thread trimmer comprising:

looptaker thread engaging means movable between a retracted position and a looptaker thread engaging position;

needle thread engaging means movable between a retracted position and a needle thread engaging position spaced from the looptaker thread engaging position;

controllable, single-operation driving means to drive the looptaker thread engaging means from its retracted position to the looptaker thread engaging position and to return the looptaker thread engaging means to its retracted position and to drive the needle thread engaging means from its retracted position to the needle thread engaging position to engage the needle thread and to return the needle thread engaging means to its retracted position;

a first ledger blade located in the path of movement of the looptaker thread engaging means from the looptaker thread engaging position to the retracted position of the looptaker thread engaging means to sever the looptaker thread; and, a second ledger blade located in the path of movement of the needle thread engaging means between the needle thread engaging location and the retracted position of the needle thread engaging means to sever the needle thread at a point remote from the reciprocating path of the needle.

2. The underbed thread trimmer of claim 1 in which the bed comprises a planar region surrounding the path of the needle, the looptaker comprises a rotary hook with a vertical axis, and the underbed thread trimmer comprises, in addition, guide means to guide the movement of the looptaker thread engaging means and the needle thread engaging means to constrain the movement of both of the engaging means to be substantially parallel to the planar region of the bed and between the bed and the proximal surface of the rotary hook.

3. The underbed thread trimmer of claim 2 in which the guide means comprises parallel straight walls defining a straight slot, and both the looptaker thread engaging means and the needle thread engaging means are constrained to slide only longitudinally in the slot.

4. The underbed thread trimmer of claim 3 in which the bed of the machine is a cylinder bed and the guide means constrains the thread engaging means to slide in the longitudinal direction of the cylinder bed.

5. The underbed thread trimmer of claim 3 in which the looptaker thread engaging means, the needle thread engaging means, and both of the ledger blades comprise blade-like members with guide portions of substantially equal width, and the guide means is rigidly attached to the bed and the distance between the parallel walls defines the width as being slightly greater than the width of the guide portions of the blade-like members.

6. The underbed thread trimmer of claim 5 in which the guide means comprises fixed restraining means extending into the slot, and each of the ledger blades comprises surface means to engage the restraining means to hold the ledger blades substantially fixed, each of the ledger blades further comprising a blade slot extending in the direction of movement of the thread engaging means, the driving means comprising a pin extending through the respective blade slot in each of the ledger blades and engaging the looptaker thread engaging means and the needle thread engaging means.

7. The underbed thread trimmer of claim 6 in which the pin rigidly engages the looptaker thread engaging means, and the blade slot through which the pin extends in the needle thread engaging means is shorter than the respective blade slot in each of the ledger blades.

8. The underbed thread trimmer of claim 6 in which the needle thread engaging position is spaced approximately three-fourths of the distance around the circumference of the rotary hook, as measured in the direction of rotation of the hook, from the point of closest proximity of the needle to the rotary hook.

9. The underbed thread trimmer of claim 5 in which the looptaker thread engaging means comprises first and second ones of the blade-like members, and the first ledger blade is a third one of the blade-like members sandwiched between the first and second blade-like members, the needle thread engaging means comprises fourth and fifth ones of the blade-like members, and the second ledger blade is a sixth one of the blade-like members sandwiched between the fourth and fifth blade-like members.

10. The underbed thread trimmer of claim 1 in which the single-operation driving means comprises:
spring means to drive both of the thread engaging means to their respective thread engaging positions; and
mechanically driven means to cock the spring means and, simultaneously, to force both of the thread engaging means to their respective retracted positions after engaging the respective threads.

11. The underbed thread trimmer of claim 10 in which the mechanically driven means comprises:
a cam;
means to rotate the cam;
a cam follower to be driven by a cam surface on the cam; and
means to support the cam follower in a waiting position adjacent one part of the cam surface and to carry the cam follower into engagement with a different part of the cam surface upon actuation of the support means.

12. The underbed thread trimmer of claim 11 in which the mechanically driven means comprises:
a first drive shaft on which the cam is rigidly mounted to be rotated with the first drive shaft as a unitary structure;
a second drive shaft parallel to the first drive shaft; and
a support member pivotally mounted on the first drive shaft and free to slide along the second drive shaft from a first location, which corresponds to the waiting position and is located adjacent a predetermined part of the cam surface, to a second location, which is adjacent a distal part of the cam surface from the first part but is not entirely beyond the cam surface.

13. The underbed thread trimmer of claim 12 in which the first drive shaft is a looptaker drive shaft, the second drive shaft is a feed drive shaft, and the cam follower is a cylindrical pin pulled into contact with the cam surface by the spring.

14. The underbed thread trimmer of claim 12 in which the cam is generally cylindrical, the cam surface is one surface of a slot in the cylindrical surface of the cam and extends generally radially with respect to the axis of the generally cylindrical cam and substantially from one end of the cam to the other, the waiting position for the support member being adjacent the one end, the thread trimmer further comprising means to limit the travel of the cam follower longitudinally with respect to the cam by a distance not substantially in excess of the length of the cam.

15. The underbed thread trimmer of claim 14 comprising, in addition:
a second cam mounted on the same shaft as the first cam to rotate therewith as a unitary structure;
a release device comprising a second cam follower;
a pivoted member having a pivotal axis substantially parallel to the axes of the drive shafts to allow the pivoted member to be pivoted between a quiescent position and an actuated position;
an axle on the pivoted member extending generally perpendicular to the pivotal axis of the pivoted member, the release device being mounted on the axle to pivot thereabout to a limited extent between a first position in which the second cam follower is displaced from the second cam to avoid contact between the second cam and the second cam follower and a second position in which the second cam follower is aligned with the second cam, whereby, during rotation of both of the cams, the second cam presses against the second cam follower to force it away from the axis of the second shaft; and
means on the release device to press against a first surface of the support member in a first direction substantially parallel to the longitudinal axis of the second drive shaft when the pivoted member is in its quiescent position corresponding to the waiting position of the support member, and to press against a second surface of the support member in a second direction at an angle to the first direction to pivot the support member about the first shaft to move the first-named cam follower radially outwardly beyond the perimeter of the first-named cam to allow the spring to move the support member and the first-named cam follower to the opposite end of the first-named cam when the second cam presses the second cam follower sufficiently far away from the axis of the second drive shaft.

16. The underbed thread trimmer of claim 15 comprising, in addition:

a drive motor;

means connecting the drive motor to rotate both of the shafts;

an arm extending from the pivoted member at an angle to the pivotal axis thereof;

a solenoid comprising a movable core connected to the arm to pivot the pivoted member when the solenoid is energized; and a normally closed switch comprising a pushbutton actuator positioned to be engaged by the release device when the pivoted member is in a position that it occupies when the solenoid is not energized, the extent of movement of the pivoted member in response to energization of the solenoid being positioned to pivot the pivoted member to move the means on the release device away from the first surface of the support member to allow the release device to pivot about the axle on the pivoted member and thereby release the pushbutton actuator of the switch;

connection means connecting the switch to the motor to cause the motor to operate when the pushbutton actuator is released to cause both of the drive shafts to turn.

17. A single operation cam arrangement comprising:

a rotatable cam body;

cam follower means movable between a waiting position adjacent a first part of the cam body and an actuated position adjacent a remote part of the cam body;

a cam surface extending along the cam body and comprising:

an entrance portion at the remote part of the cam body to engage the cam follower when the cam follower is in its actuated position and the cam is rotated, and an exit end adjacent the first part of the body; and a resilient trap attached to the cam body between the other end of the cam surface and the waiting position of the cam follower, the trap being resiliently movable to allow the cam follower to be forced past the trap by pressure of the cam surface as the cam rotates.

18. The single operation cam arrangement of claim 17 in which the cam body is substantially cylindrical and the cam surface is one generally helical surface of a slot extending along the cylindrical surface of the cam body.

19. The single operation cam arrangement of claim 18 in which the resilient trap comprises an annular disc at one end of the slot, the disc having a generally radial slot adjacent the proximal end of the slot and angularly displaced from the cam surface in the direction of rotation of the cam.

* * * * *